United States Patent Office 2,911,364
Patented Nov. 3, 1959

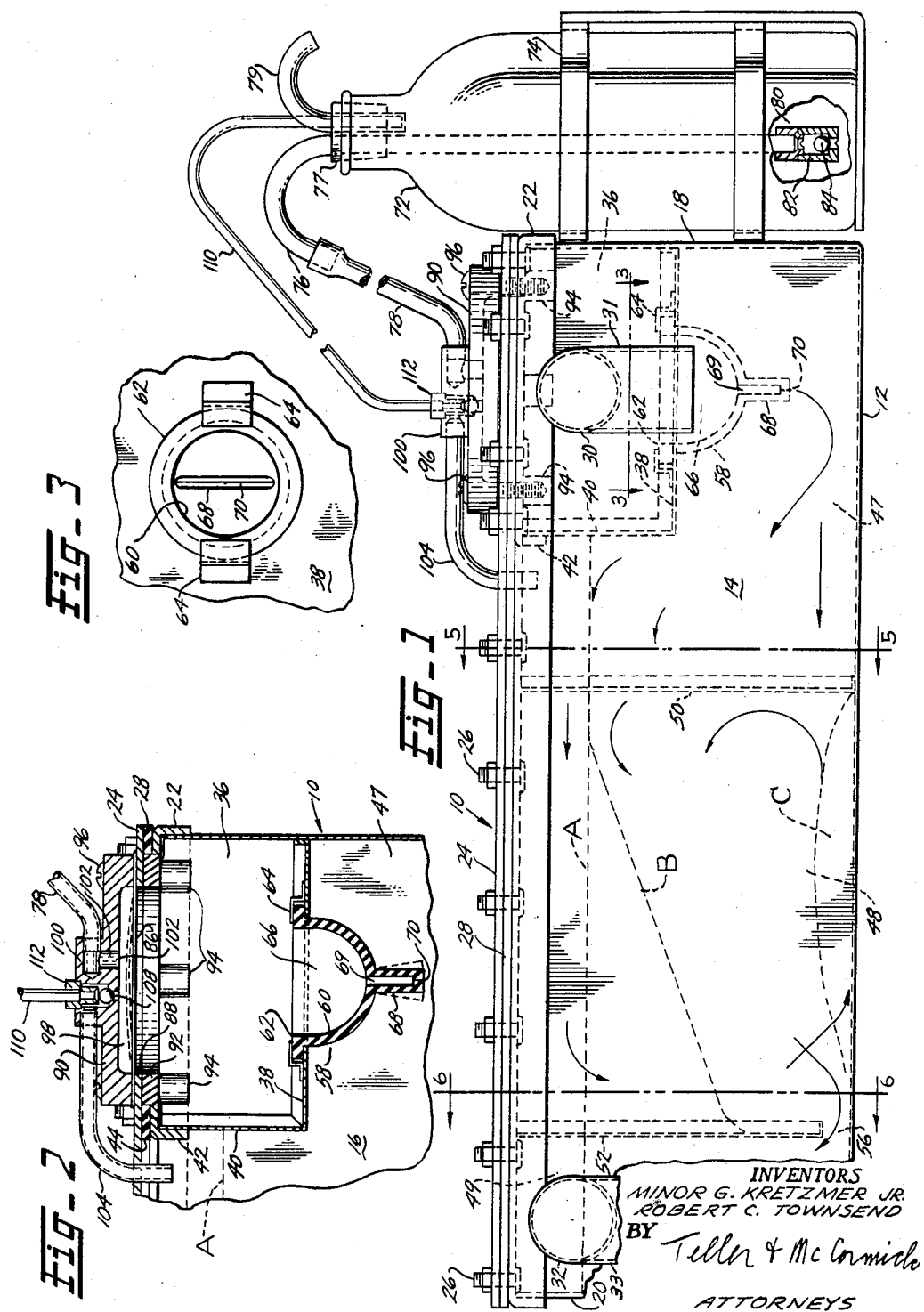

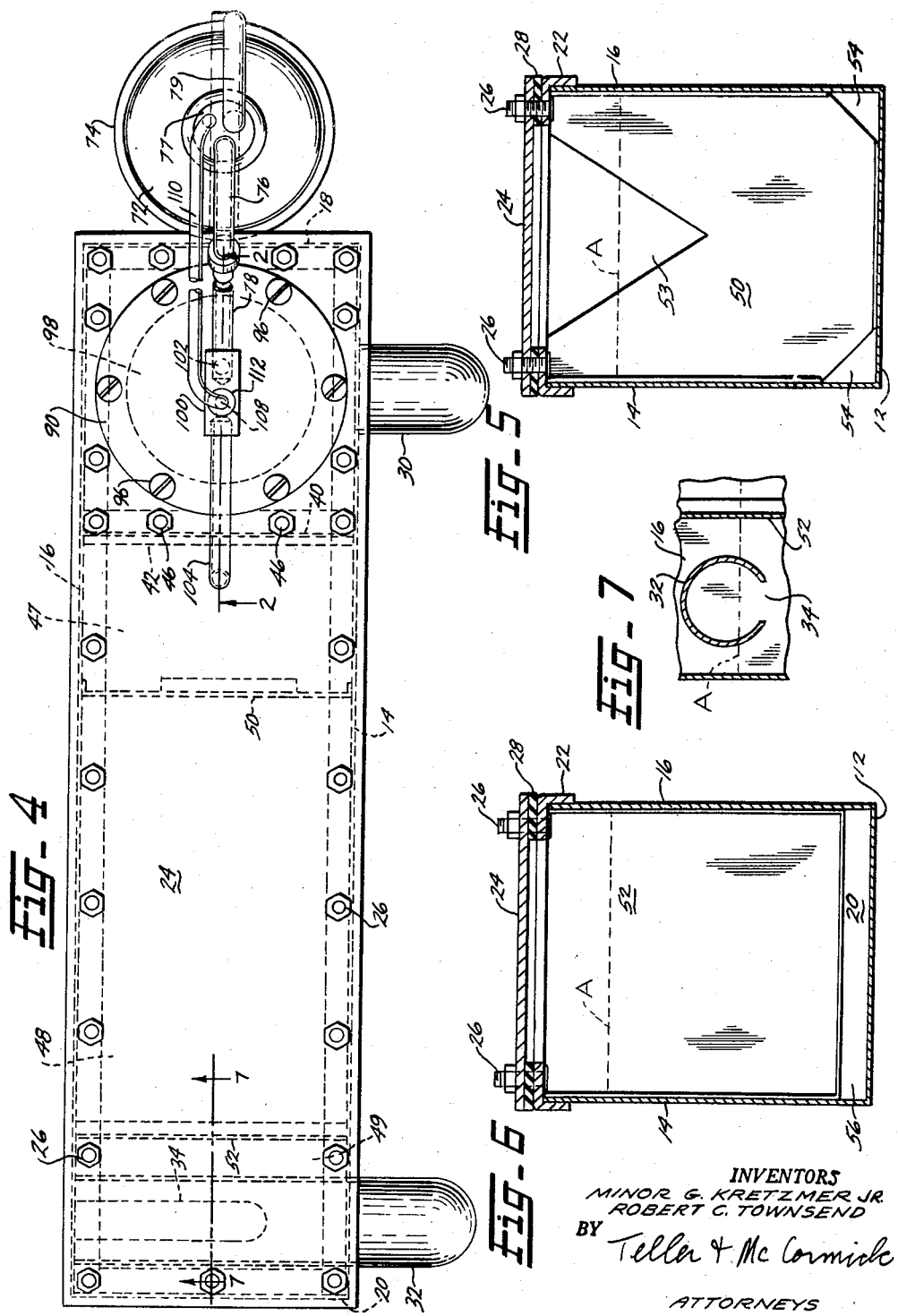

2,911,364

APPARATUS FOR THE TREATMENT OF TOILET WASTE

Minor G. Kretzmer, Jr., Middle Haddam, and Robert C. Townsend, Higganum, Conn., assignors to North and Judd Manufacturing Company, New Britain, Conn., a corporation of Connecticut Application October 4, 1956, Serial No. 613,884

17 Claims. (Cl. 210—207)

This application is a continuation-in-part of our copending application Ser. No. 522,778, filed July 18, 1955, now abandoned, and entitled Apparatus for the Treatment of Toilet Waste.

On many lakes and rivers in popular resort areas, there is very serious water pollution as the result of discharge into the water of green toilet waste from the toilets of private and other boats. The general object of the present invention is to provide a simple, inexpensive, effective and easily installed apparatus for use on a boat for treating and disinfecting the waste from the toilet thereof prior to the final discharge of said waste from the boat.

It will be understood that an apparatus embodying certain features of the invention, while primarily intended for a boat, is not necessarily so limited and may be used in connection with any toilet. However, it is a further and more specific object of the invention to provide an apparatus particularly adapted for use in conjunction with a toilet of the marine type, wherein the waste is removed by a pumping action in said toilet and is delivered to the apparatus in successive batches, each under pressure. According to conditions of use, from 4 to 10 or more pumping strokes are ordinarily required for each flushing of the toilet.

A further and more particular object of the invention is to provide an apparatus wherein the variations in pressure due to the successive pumping actions at the toilet are utilized for supplying regulated quantities of a disinfectant solution to the waste material.

A further object of the invention is to provide improved means for controlling and regulating the flow of waste through the apparatus so as to ensure proper mixing with and treatment by the solution.

Other objects of the invention will be apparent from the drawings and from the following description and claims.

In the drawings we have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a side view of an apparatus embodying the invention.

Fig. 2 is a fragmentary longitudinal vertical sectional view taken along the line 2—2 of Fig. 4.

Fig. 3 is a fragmentary plan view taken along the line 3—3 of Fig. 1.

Fig. 4 is a plan view.

Fig. 5 is a transverse vertical sectional view taken along the line 5—5 of Fig. 1.

Fig. 6 is a transverse vertical sectional view taken along the line 6—6 of Fig. 1.

Fig. 7 is a fragmentary longitudinal vertical sectional view taken along the line 7—7 of Fig. 4.

In accordance with one phase of the invention, the apparatus comprises means forming a pressure chamber and means forming a treatment chamber, the toilet waste first entering the pressure chamber and then passing into the treatment chamber. These means that form these chambers may be variously constructed and arranged, but as shown in the drawings the apparatus preferably includes a tank 10, which is preferably rectangular with its length considerably greater than its width. The major portion of the interior of the tank constitutes the before-mentioned treatment chamber.

The tank 10 has a bottom wall 12, front and rear side walls 14 and 16, and right and left end walls 18 and 20. The tank may advantageously be formed from sheet metal bent to form the several walls and welded at the corners. The tank is closed at the top by a flat cover 24 which may be held in place in any suitable manner, as for instance by welding or bolting. While the invention is not so limited, the cover is shown as bolted in place, and for this purpose there is provided at the top of the tank a peripheral flange 22, preferably welded to the side and end walls. As shown, the flange is angle-shaped and said flat cover 24 is secured thereto by bolts 26, 26, a gasket 28 being interposed between the flange and the cover. The invention is not limited to a tank of any particular size, but for treating the waste from a single toilet it has been found ordinarily sufficient to provide a tank having a length of approximately 20", a width of approximately 5½" and a depth of approximately 6½".

Connected with the tank near the top thereof are intake and discharge pipes 30 and 32. These pipes may be variously located, but they are preferably located at and extend through the front wall 14 near opposite ends thereof. As shown, the intake pipe 30 is near the right end and the discharge pipe 32 is near the left end. The intake pipe 30 terminates approximately at said front wall 14. The discharge pipe extends across the tank to the opposite rear wall 16, and it is provided with a narrow slot 34 in the bottom thereof as best shown in Fig. 7. The slot 34 extends from said rear wall 16 to a point between the central plane of the tank and said front wall 14, and said pipe is entirely closed within the tank except for said slot. Preferably and as shown, the pipes 30 and 32 are provided with elbows at their ends so as to have depending portions 31 and 33.

In the preferred embodiment of the invention, the before-mentioned pressure chamber is provided in the upper right portion of the tank, this chamber being shown at 36 and being so located that the intake pipe 30 communicates directly with it. The cross-sectional area of the pipe 30 is substantially less than that of the chamber 36. The chamber 36 may be variously formed, but as shown it is formed by a horizontal wall 38 and a vertical wall 40 welded to the side walls 14 and 16 and to the end wall 18. A transverse angle flange 42 is connected with the vertical wall 40 and is at the same level as the peripheral flange 22. A portion 44 of the gasket 28 extends transversely along the top of the flange 42. Bolts 46, 46 extend through the cover 24 and into the flange 42 to insure a tight joint at the transverse portion 44 of the gasket.

It will be observed that the walls forming the chamber 36 are so positioned that said chamber is directly above a portion of the treatment chamber in the main portion of the tank. The bottom wall 38 of the pressure chamber has an opening with a valve therein, as hereinafter described in detail, this opening communicating with the last said portion of the treatment chamber. The toilet waste enters the chamber 36 through the intake pipe 30 and is then discharged downward through the opening in the wall 38 and into the treatment chamber.

The treatment chamber in the tank 10 is preferably divided into compartments, three compartments 47, 48 and 49 being shown. Said compartments are sometimes hereinafter referred to respectively as the first, second and third compartments. As shown, the first compartment 47 is at the right and is partly beneath the pressure chamber 36. The opening in the bottom wall of the pressure chamber communicates with said compartment 47. For providing the three compartments there are two transverse partitions or baffle plates 50 and 52 in the tank, these preferably being welded in place. The two partition plates 50 and 52 are sometimes hereinafter referred to respectively as first and second partition plates. The partition 50 is relatively close to the compression chamber 36 and the partition 52 is relatively close to the discharge pipe 32. The second compartment 48 between the partitions 50 and 52 is preferably somewhat longer, proportionately, than shown in the drawings. Each partition plate preferably extends to or nearly to the under face of the cover 24, and as shown each partition plate abuts at the top against the peripheral flange 22, a space being thus provided between the top of the plate and the cover 24.

The first plate 50 is substantially imperforate at the bottom and it has a large notch or passageway 53 in the upper portion thereof, this preferably being V-shaped as shown. Said plate 50 extends to the bottom wall 12, and although substantially imperforate it nevertheless preferably has two cuts which provide triangular corner openings or passageways 54, 54. The notch 53 and the openings 54, 54 may be somewhat smaller or larger than shown. The upper portion of the plate 52 is imperforate or substantially imperforate, and the bottom of said plate is above the bottom 12 of the tank. A rectangular passageway 56 is thus provided below said plate 52.

As will be hereinafter apparent, it is important that a space or passageway be provided over the top of each partition plate. Such passageway may be variously provided, but as shown said passageway for the plate 50 is partly provided by the notch 53. Said passageway for the plate 54 is provided by the spacing between the top of the plate and the cover 24.

The tank 10, at least at the interior thereof, and all plates, pipes and the like are resistant to the corrosive action of the hereinafter described disinfectant and of salt water. The material of the tank and said parts may be inherently so resistant, or, if metal, it may be covered with a resistant coating or not as necessary.

As before stated, an opening is provided between the pressure chamber 36 and the compartment 47 of the treatment chamber. This opening constitutes a connection for the discharge of waste from the pressure chamber to the treatment chamber, said opening having a cross-sectional area substantially less than that of either chamber. A valve 58 is preferably provided at the last opening, said valve being normally closed. However, the valve is openable when subjected to pressure from the pressure chamber. Said valve 58 is shown as being a single member formed of synthetic rubber or generally equivalent material. The opening in said wall 38 is circular and said valve 58 has a main body 60 which projects downwardly through said opening. Above the wall 38 said valve 58 has a circular flange 62 which is engaged and held by metal clips 64, 64 secured to said wall. A recess 66 is provided within the body of the valve and in communication with the pressure chamber. The valve 58 has a downward projection 68 below the main body and said projection has a slot 69 therein which is open at the top. At the bottom of the slot 69 there is a cut 70 the sides of which are biased into contact with each other by the resiliency of the material. However, when subjected to interior pressure the portions of the projection 68 at the sides of the slot 69 are pressed away from each other, as indicated by dotted lines, to open the cut 70 and to permit the downward passage or discharge of liquid or other material within the pressure chamber. The valve 58, while permitting downward passage of the material, prevents or at least restricts any upward passage.

Means including a pump is provided for introducing a suitable disinfectant solution into the first compartment 47 of the tank at the right of the baffle plate 50. A container is provided for the required disinfectant solution and this container may be variously formed and variously located. As shown, the container is a bottle 72 held in a rack 74. As shown, the rack 74 is not directly connected with the tank, but if desired it may be connected either with the end wall 18 of the tank or with one of the side walls 14 and 16 thereof or with the cover 24 thereof. For convenience of illustration a relatively small bottle is shown, and in practice a larger bottle is preferable. A rigid duct tube 76 extends into the container or bottle through a hole in a cork 77, a flexible duct tube 78 connecting said rigid tube with said pump. A vent hole is provided in said cork 77 to admit air to the upper portion of the container or bottle. As shown, a vent tube 79 extends through said hole in the cork.

A first check valve 80, preferably a ball check, is provided at the lower end of the tube 76 and within the bottle 72. This check valve comprises a hollow body 82 into which the lower end of the tube extends. The opening in the body has a reduced diameter near the bottom and a seat is provided for a ball 84. The ball permits liquid to enter the tube 76 from the bottle but prevents any reverse flow of liquid. The tubes 76 and 78 are sometimes hereinafter referred to collectively as constituting a duct leading from said container 72.

As stated, the means for introducing liquid into the chamber 47 includes a pump and said pump is preferably pressure responsive and is connected with said duct 76, 78. Said pressure responsive pump is shown more particularly in Fig. 2, and it includes a member movable in response to pressure which member is preferably a normally flat, but elastic, diaphragm 86 which extends across a large circular opening 88 in the cover 24 of the tank above the pressure chamber 36. Said diaphragm is held in place by a superposed circular valve plate 90. Secured to the bottom of the cover 24 is a ring 92 having bosses 94, 94. Screws 96, 96 extend through the plate 90 and into said bosses 94, 94 for securing the plate in place.

The plate 90 has a valve chamber 98 therein above the diaphragm 86 and the diaphragm, when subjected to pressure from below, is flexed upwardly into said chamber as indicated by dotted lines. The plate 90 has a boss 100 at the top which has a hole into which fits the discharge end of the tube 78, a vertical hole 102 providing communication with the valve chamber 98. The boss 100 has another hole into which fits a flexible tube 104 which extends through a suitable hole into the compartment 47 of the main tank at the left of the pressure chamber. Said tube constitutes a duct from the pump to the tank. There is a fluid-tight joint or seal for said duct or tube, so that liquid and gases in the tank cannot escape upwardly around said tube. A second check valve is provided between the valve chamber 98 and said tube 104. As shown, the tube 104 communicates with a vertical hole 106 closed at the top and having a smaller bottom portion which communicates with the valve chamber 98 and provides a seat for a ball 108. The ball permits liquid to enter the tube 104 from the chamber 98 but prevents any reverse flow of liquid.

When the apparatus is installed in a boat, the intake pipe 30 is connected by a suitable pipe or tube with the outlet of the toilet, the toilet as above stated being of the pressure type and operating by a pumping action to deliver the waste material in successive batches, each under pressure. The discharge outlet 32 of the apparatus is connected with a suitable pipe or tube so that the treated waste material can be discharged overboard. The container or bottle 72 contains a suitable disinfectant solution and the invention is not limited as to the nature of this disinfectant solution. However, it has been found satisfactory to provide a solution of sodium hypochlorite with a concentration of approximately 5.25% by weight.

In describing the operation of the apparatus it will be assumed that the pressure chamber 36 is already filled or substantially filled with liquid, that the several compartments of the treatment chamber are partly filled with liquid up to, or at least nearly up to, the level A as indicated in Fig. 1, such level being established by the slot 34 in the discharge pipe 32. The before-mentioned passageways over the tops of the partition plates prevent any entrapment of air at the top which would prevent the liquid in any compartment from rising at least to said level A. It will also be assumed that the valve chamber 98 is filled with the disinfectant solution. Each batch of toilet waste is delivered under pressure into the pressure chamber. As the toilet is successively flushed, it serves to momentarily establish increased pressures in said pressure chamber 36, and each increased pressure in said chamber has two results which will be explained in detail.

One result of the said increased pressure in the pressure chamber 36 is the spreading of the walls of the valve projection 68 to open the cut 70 and to permit the downward escape of some of the material in the pressure chamber. By reason of previous flushings of the toilet, a quantity of partly solid matter, including paper, has presumably accumulated in the recess 66 of the valve 58. When the cut 70 is opened as the result of increased pressure, this previously accumulated solid matter, and also liquid, is forced downwardly through the cut and into the right compartment 47 of the treatment chamber. As soon as the momentary pressure is released, the inherent resiliency of the valve recloses or substantially closes the cut 70. The cut 70, even when opened, provides only a very narrow slot and as solid or semi-solid material is forced through said slot, said material is broken up and is reduced to a pulverulent condition in which it tends to be suspended in the liquid. The waste is delivered into the compartment 47 under pressure, and this pressure may sometimes accumulate in the tank as hereinafter stated. When the delivery through the valve 58 is rapid, the liquid level in the tank may temporarily rise considerably above the level A.

The other result of the increased pressure in the pressure chamber 36 is the upward deflection of the diaphragm 86 to a position such as that shown by dotted lines in Fig. 2. As the diaphragm moves upwardly, liquid in the valve chamber 98 is forced past the second valve at 108 and thence through the duct 104 into the first compartment 47 of the treatment chamber. When the pressure in the pressure chamber is reduced, the diaphragm returns to its normal position as shown in full lines in Fig. 2 and the disinfectant liquid in the valve chamber 98 is replenished from the container 72, the liquid flowing upwardly past the first valve at 84 and through the ducts 76, 78. It will be apparent that the diaphragm 86 and the parts cooperating therewith constitute a pressure responsive pump, this pump serving to deliver a regulated quantity of disinfectant solution into the treatment chamber as each batch of toilet waste is delivered into the pressure chamber 36. It will also be apparent that the valve 58 cooperates with the pump means in such manner as to ensure proper operation thereof. The valve 58 offers resistance to the downward discharge of toilet waste from the chamber 36 and the resistance so provided causes increased pressure in said chamber which in turn causes the described upward flexing of the diaphragm 86.

The total quantity of disinfectant solution supplied to the treatment chamber is at least approximately proportionate to the requirement therefor. The number of pumping strokes required for flushing the toilet varies according to conditions of use and the number of strokes may ordinarily range from 4 to 10 or more. A quantity of the disinfectant solution will be delivered for each full pumping stroke and therefore the total quantity of disinfectant solution delivered for each flushing is roughly proportionate to the need therefor.

The toilet waste delivered through the valve 58 into the lower right or first compartment 47 of the treatment chamber moves for the most part upwardly and toward the left so as to pass through the notch 53 in the baffle plate 50 and into the intermediate or second treatment compartment 48. Small portions of the toilet waste may pass through the openings 54, 54 at the corners of the said baffle plate 50, but these openings are provided primarily to prevent dead spaces at the left corners of the compartment 47 and to prevent the accumulation of solid material in the said corners. As the toilet waste passes through the notch 53, it is mixed with the disinfectant solution delivered through the duct 104. In the compartment 48 the toilet waste moves generally downwardly and toward the left and it then passes through the opening 56 into the third compartment and finally the effluent flows into the discharge pipe 32 through the slot 34 therein.

The major portion of the actual treatment takes place in the intermediate or second treatment compartment 48. It has been found that the waste material entering the compartment 48 includes some solid matter that tends to float and other solid matter that tends to settle. The floating solid matter forms a generally triangular layer B as indicated in Fig. 1 and the heavier solid matter that settles forms a layer C as also indicated in Fig. 1. Between the layers B and C the liquid is relatively clear. Between flushings the floating solid matter in layer B and the heavier solid matter in layer C, and in fact all of the liquid and solid materials in said compartments 47, 48 and 49, continue to be acted upon by the disinfectant. While in said compartments said solid materials because of continued contact with liquid are progressively softened and disintegrated. The more or less solid materials referred to as being in the said layers B and C are not permanently located and the said layers and the materials therein are readily mobile. With each flushing, portions of the materials in the said layers are removed and replaced by other similar materials.

The narrow slot 34 at the bottom of the discharge pipe 32 is slightly below the liquid level in the third compartment or final compartment. Any materials that still tend to float after reaching the third compartment cannot readily enter the slot and such materials are temporarily retained at the surface of the liquid in said compartment so as to be subject to additional softening and disintegration and to additional disinfecting action.

The waste material is retained in the treatment chamber and more particularly in the second compartment 48 for a substantial period of time, this period of course varying with the frequency of use of the toilet. The capacity of the described pump means is sufficient to always provide a supply of disinfectant somewhat in excess of that actually needed. Under ordinary conditions the period of retention of the waste in the compartments of the tank is ample to enable the disinfectant to act so that there is a low bacterial count in the effluent discharged through the pipe 32. The capacity of the particular apparatus shown and described is such that it will continuously handle major functionings of the toilet spaced at 15 minute intervals, or four an hour. The retention or "kill" time is preferably at least 15 minutes, and the supplied excess of disinfectant is such that the oxidizing effect thereof is to reduce the bacterial count of each function to 240 $E.$ $Coli.$ or less per 100 cc. during each 15 minute minimum retention time. It will of course be understood that the invention is not limited to an apparatus of any one capacity and that a larger or a smaller apparatus may be made without departing from the invention.

When the apparatus is installed above the water line of the boat, the effluent flows by gravity through the discharge pipe 32. When the apparatus is so installed, there is a tendency toward the formation of a partial vacuum in the upper portion of the tank or treatment chamber, this being particularly so when the portion 33 of said pipe 32 extends below the water level. With the disinfectant ducts as thus far described, a partial vacuum in the upper portion of the tank or treatment chamber would open the valves at 108 and 84 and would withdraw disinfectant in a continuous stream from the container 72 to the tank. With such a partial vacuum, the container might be completely emptied in a few minutes without any operation of the toilet.

In order to avoid any withdrawal of disinfectant as the result of partial vacuum, a vent is provided in communication with the duct 104 beyond the second valve 108, which vent has a means for restricting flow therein to prevent any undue loss therethrough of disinfectant supplied under pressure to said duct 104. Preferably and as shown said restricting means is a third valve, but the invention is not necessarily so limited. It is preferred to provide said vent in the form of a tube or duct 110 which is entered in a plug 112, the plug being inserted in a hole in the boss 100 immediately above the ball of the second valve. A separate third valve might be provided for the vent or duct, but preferably and as shown the plug 112 has a conical seat immediately above and in register with the ball 108. Upward movement of the ball prevents the escape of disinfectant through the vent or tube 110. The ball 108 in conjunction with its seat in the plate 90 constitutes said second valve and said ball in conjunction with its seat in the plug 112 constitutes said third valve. The duct 110 preferably extends to and terminates in the container 72 as shown in Fig. 1.

During normal operation as previously described, increased pressure in the chamber 36 moves the diaphragm 86 upwardly and causes the disinfectant to lift the ball 108, the disinfectant then flowing through the duct 104 and into the tank. As the ball 108 is lifted it engages the valve seat at the bottom of the plug 112 and prevents the escape of disinfectant through the vent or duct 110. If the ball 108 should fail to completely seat against the plug 112 a small amount of disinfectant would pass into the duct 110 but no harm would result and any such disinfectant would either be retained in said duct or transferred back to the container 72.

In the event of a tendency to form a partial vacuum in the tank, the formation of such a vacuum is prevented by the inflow of air through the ducts 110 and 104, the ball 108 remaining in the position shown in Fig. 2 and the second valve being closed. Air is withdrawn from the container 72 but is replaced by air flowing into the container through the vent 79.

When the apparatus is installed below the water line, an upwardly extending duct must be connected with the pipe 32, and discharge of the effluent must be effected by reason of pressure developed within the tank. Inasmuch as the waste is delivered to the apparatus under pressure developed by the pump of the toilet, it will be evident that sufficient pressure may be built up within the tank to cause the necessary discharge through the pipe 32. A body of air is trapped in the tank above the level of the slot 34 in the discharge pipe 32 and this entrapped air provides a cushion for the dampening of sudden pressure rises within the treatment chambers in contrast to the desired sudden pressure rises within the pressure chamber during the successive strokes of the toilet pump. The pressure within the tank, while sufficient for the required purpose, is relatively small and is not such as to materially interfere with the described discharge of disinfectant into said tank by the action of the pump.

When the apparatus is installed below the water line, the duct 110 and the plug 112 are omitted and the plug 112 is replaced by a similar plug, not shown, having no aperture therein. With the apparatus below the water line, there is no tendency to form a partial vacuum in the tank or treatment chamber and the vent or duct 110 is not needed. Furthermore, said vent or duct 110 if retained would provide an unobstructed passage from the tank through the duct 104 and said vent 110 to the container 72 and water would flow freely into said container. Also, said vent 110 if retained would tend to prevent the building up of sufficient pressure within the tank or treatment chamber to effect the described upward discharge of effluent therefrom.

An apparatus embodying the invention serves effectively to disinfect toilet waste in the manner described and prior to the final discharge thereof. The apparatus requires little or no attention, other than the occasional replenishing of the disinfectant solution. The bottle 72, when empty or nearly empty, can be replaced by a filled bottle. Before removing the bottle 72, the cork 77 is withdrawn together with the tubes 78, 79 and 112. When a filled bottle is in place, the cork and the tubes are replaced. The check valve 84 by reason of its location at the bottom of the tube 78 prevents the loss of liquid from said tube during bottle substitution.

It will be apparent that the apparatus is a single compact unit that can be readily installed in a previously constructed boat or in a new boat during construction. The apparatus requires no external connections other than at the intake and discharge pipes, and it is so constructed that the disinfectant solution is automatically supplied upon each toilet flushing by actuation of the toilet itself without any links or similar mechanical devices connected with the toilet.

The invention claimed is:

1. In an apparatus for the treatment of toilet waste, the combination of means forming a pressure chamber, an intake pipe communicating with said pressure chamber and having a cross-sectional area substantially less than that of said pressure chamber which intake pipe is connectible with a toilet to receive successive quantities of toilet waste therefrom and to momentarily establish increased pressures in said chamber, means forming a treatment chamber adjacent the pressure chamber and separate therefrom, a connection for the discharge of waste from the pressure chamber to the treatment chamber which connection has a cross-sectional area substantially less than that of either chamber, a container for a disinfectant solution, a duct leading from said container to said treatment chamber, and means dependent upon each momentarily increased pressure within said pressure chamber for causing a quantity of the disinfectant solution to flow through said duct from said container and to said treatment chamber for mixing with toilet waste received therein from the pressure chamber.

2. In an apparatus for the treatment of toilet waste, the combination of means forming a pressure chamber having a large opening therein, a diaphragm extending over and closing said opening which diaphragm is adapted to be flexed as the result of changes of pressure in said chamber, an intake pipe communicating with said pressure chamber and connectible with a toilet to receive successive quantities of toilet waste therefrom and to momentarily establish increased pressures in said chamber each of which increased pressure serves to flex said diaphragm, means forming a treatment chamber adjacent the pressure chamber, said treatment chamber being connected to receive waste from said pressure chamber, a discharge pipe connected with said treatment chamber at a position remote from said pressure chamber, a container for a disinfectant solution, a duct leading from said container to said treatment chamber, and means dependent upon each flexing of said diaphragm for causing a quantity of the disinfectant solution to flow through said duct from said container and to said treatment chamber for mixing with toilet waste received therein from the pressure chamber.

3. In an apparatus for the treatment of toilet waste, the combination of means forming a pressure chamber having a large opening therein, means forming a valve chamber adjacent said opening, a diaphragm closing said opening and interposed between said pressure and valve chambers which diaphragm is adapted to be flexed as the result of changes in pressure in said pressure chamber, an intake pipe communicating with said pressure chamber and connectible with a toilet to receive successive quantities of toilet waste therefrom and to momentarily establish increased pressures in said pressure chamber each of which increased pressure serves to flex said diaphragm, means forming a treatment chamber adjacent the pressure chamber, said treatment chamber being connected to receive waste from said pressure chamber, a discharge pipe connected with said treatment chamber at a position remote from said pressure chamber, a container for a disinfectant solution, a first duct leading from said container to said valve chamber, a second duct leading from said valve chamber to said treatment chamber, and two check valves located respectively in said first and second ducts and respectively permitting flow of disinfectant solution to and from said valve chamber but preventing reverse flow, the last said check valves cooperating with said diaphragm upon each flexing thereof to cause a quantity of the disinfectant solution to flow through said ducts from said container and to said treatment chamber for mixing with toilet waste received therein from the pressure chamber.

4. An apparatus for the treatment of toilet waste as set forth in claim 3, wherein the first duct extends downwardly and has a lower intake end within said container, and wherein the check valve for said first duct is carried thereby near the lower intake end thereof.

5. In an apparatus for the treatment of toilet waste, the combination of means forming a pressure chamber having a large opening therein, means forming a valve chamber adjacent said opening, a movable member closing said opening and interposed between said pressure and valve chambers which movable member is adapted to be moved outwardly as the result of changes in pressure in said pressure chamber, an intake pipe communicating with said pressure chamber and connectible with a toilet to receive successive quantities of toilet waste therefrom under pressure, means forming a treatment chamber adjacent the pressure chamber, said treatment chamber being connected to receive waste from said pressure chamber, a discharge pipe connected with said treatment chamber at a position remote from said pressure chamber, a container for a disinfectant solution, a first duct leading from said container to said valve chamber, a second duct leading from said valve chamber to said treatment chamber, first and second check valves located respectively in said first and second ducts and respectively permitting flow of disinfectant solution to and from said valve chamber but preventing reverse flow, said check valve cooperating with said movable member upon outward movement thereof to cause successive quantities of the disinfectant solution to flow through said ducts from said container and to said treatment chamber for mixing with toilet waste received therein from the pressure chamber, a normally open vent connected with said second duct to prevent the formation of a partial vacuum in said treatment chamber, and a third valve constructed or positioned to close said vent when disinfectant is caused to flow through said second duct.

6. An apparatus for the treatment of toilet waste as set forth in claim 5, wherein a single ball serves as the movable member of said second and third valves.

7. An apparatus for the treatment of toilet waste as set forth in claim 5, wherein said vent is a duct extending to and terminating in said disinfectant container.

8. In an apparatus for the treatment of toilet waste, the combination of means forming a pressure chamber, an intake pipe communicating with said pressure chamber and connectible with a toilet to receive successive quantities of toilet waste therefrom and to momentarily establish increased pressures in said chamber, means forming a treatment chamber adjacent the pressure chamber, a pressure openable valve between the pressure and treatment chambers which permits toilet waste when subjected to increased pressure to flow from said pressure chamber to said treatment chamber which valve automatically restricts any reverse flow, a discharge pipe connected with said treatment chamber at a position remote from said valve, a container for a disinfectant solution, a duct leading from said container to said treatment chamber, and means dependent upon each momentarily increased pressure within said pressure chamber for causing a proportional quantity of the disinfectant solution to flow through said duct from said container and to said treatment chamber for mixing with toilet waste received therein from said pressure chamber.

9. In an apparatus for the treatment of toilet waste the combination of means forming a pressure chamber having a large opening therein, a diaphragm extending over and closing said opening which diaphragm is adapted to be flexed as the result of changes of pressure in said chamber, an intake pipe communicating with said pressure chamber and connectible with a toilet to receive successive quantities of toilet waste therefrom and to momentarily establish increased pressures in said chamber each of which increased pressure serves to flex said diaphragm, means forming a treatment chamber adjacent the pressure chamber, a pressure openable valve between the pressure and treatment chamber which permits toilet waste when subjected to increased pressure to flow from said pressure chamber to said treatment chamber which valve automatically restricts any reverse flow, a discharge pipe connected with said treatment chamber at a position remote from said valve, a container for a disinfectant solution, a duct leading from said container to said treatment chamber, and means dependent upon each flexing of said diaphragm for causing a quantity of the disinfectant solution to flow through said duct from said container and to said treatment chamber for mixing with toilet waste received therein from said pressure chamber.

10. In an apparatus for the treatment of toilet waste, the combination of means forming a pressure chamber, an intake pipe communicating with said pressure chamber and connectible with a toilet to receive successive quantities of toilet waste therefrom under pressure, means forming a treatment chamber adjacent the pressure chamber, a pressure openable valve between the pressure and treatment chambers which comprises a single resilient member with a normally closed cut therein, said valve when subjected to pressure from said pressure chamber being opened at said cut to provide a very narrow slot through which the toilet waste is forced with resultant breaking up of solid matter therein, a discharge pipe connected with said treatment chamber at a position remote from said valve, a container for a disinfectant solution, a duct leading from said container to said treatment chamber, and means dependent upon each momentarily increased pressure within said pressure chamber for causing a quantity of the disinfectant solution to flow through said duct from said container and to said treatment chamber for mixing with toilet waste received therein from said pressure chamber.

11. In an apparatus for the treatment of toilet waste, the combination of means forming a pressure chamber having a horizontal bottom wall with an opening therein, an intake pipe communicating with said pressure chamber and connectible with a toilet to receive successive quantities of toilet waste therefrom under pressure, means forming a treatment chamber at least partly below the pressure chamber, a pressure openable valve in said opening in the bottom wall of the pressure chamber which comprises a single resilient member with an upwardly open recess therein for the accumulation of solid material, said member having a normally closed cut therein below said recess and said valve when subjected to pressure from said pressure chamber being open at said cut to provide a very narrow slot through which the toilet waste is forced with resultant breaking up of solid matter therein, a discharge pipe connected with said treatment chamber at a position remote from said valve, a container for a disinfectant solution, a duct leading from said container to said treatment chamber, and means dependent upon each momentarily increased pressure within said pressure chamber for causing a quantity of the disinfectant solution to flow through said duct from said container and to said treatment chamber for mixing with toilet waste received therein from said pressure chamber.

12. In an apparatus for the treatment of toilet waste, the combination of means forming a pressure chamber having a horizontal bottom wall with an opening therein, an intake pipe communicating with said pressure chamber and connectible with a toilet to receive successive quantities of toilet waste therefrom under pressure, means forming a treatment chamber at least partly below the pressure chamber, a pressure openable valve in said opening in the bottom wall of the pressure chamber which comprises a single resilient member with an upwardly open recess therein for the accumulation of solid material, said member having a normally closed cut therein below said recess and said valve when subjected to pressure from said pressure chamber being open at said cut to provide a very narrow slot through which the toilet waste is forced with resultant breaking up of solid matter therein, a discharge pipe connected with said treatment chamber at a position remote from said valve, a container for a disinfectant solution, a first duct leading from said container to said valve chamber, a second duct leading from said valve chamber to said treatment chamber, two check valves located respectively in said first and second ducts and respectively permitting flow of disinfectant solution to and from said valve chamber but preventing reverse flow, the last said check valves cooperating with said diaphragm upon flexing thereof to cause successive quantities of the disinfectant solution to flow through said ducts from said container and to said treatment chamber for mixing with toilet waste received therein from the pressure chamber, a normally open vent connected with said second duct to prevent the formation of a partial vacuum in said treatment chamber, and a third valve constructed or positioned to close said vent when disinfectant is caused to flow through said second duct.

13. In an apparatus for the treatment of toilet waste, the combination of a rectangular tank, walls within the tank providing a pressure chamber and a treatment chamber therein, one of said walls having an opening for the passage of toilet waste from said pressure chamber to said treatment chamber, an intake pipe near one end of the tank and communicating with said pressure chamber which pipe is connectible with a toilet to receive successive quantities of toilet waste therefrom and to momentarily establish increased pressures in said chamber, a container for a disinfectant solution, a duct leading from said container to said treatment chamber adjacent the pressure chamber, means dependent upon each momentarily increased pressure within said pressure chamber for causing a quantity of the disinfectant solution to flow through said duct from said container and to said treatment chamber for mixing with toilet waste received therein from said pressure chamber, and a discharge pipe near the other end of the tank and connected with said treatment chamber for the discharge of effluent therefrom.

14. In an apparatus for the treatment of toilet waste, the combination of a rectangular tank, walls within the tank providing a pressure chamber and a treatment chamber therein, one of said walls being substantially horizontal so that said pressure chamber is above a portion of said treatment chamber which last said wall has an opening therein for the passage of toilet waste from said pressure chamber to said treatment chamber, an intake pipe near one end of the tank and communicating with said pressure chamber which pipe is connectible with a toilet to receive successive quantities of toilet waste therefrom and to momentarily establish increased pressures in said chamber, a container for a disinfectant solution, a duct leading from said container to said treatment chamber, means dependent upon each momentarily increased pressure within said pressure chamber for causing a quantity of the disinfectant solution to flow through said duct from said container and to said treatment chamber for mixing with toilet waste received therein from said pressure chamber, and a discharge pipe near the other end of the tank and connected with said treatment chamber for the discharge of effluent therefrom.

15. In an apparatus for the treatment of toilet waste, the combination of a rectangular tank, walls within the tank providing a pressure chamber and a treatment chamber therein, one of said walls having an opening for the passage of toilet waste from said pressure chamber to said treatment chamber, an intake pipe near one end of the tank and communicating with said pressure chamber which pipe is connectible with a toilet to receive successive quantities of toilet waste therefrom and to momentarily establish increased pressures in said chamber, a pressure openable valve in the last said opening which valve permits toilet waste when subjected to increased pressure to flow from said pressure chamber to said treatment chamber which valve automatically restricts any reverse flow, a container for a disinfectant solution, a duct leading from said container to said treatment chamber, means dependent upon each momentarily increased pressure within said pressure chamber for causing a quantity of the disinfectant solution to flow through said duct from said container and to said treatment chamber for mixing with toilet waste received therein from said pressure chamber, and a discharge pipe near the other end of the tank and connected with said treatment chamber for the discharge of effluent therefrom.

16. In an apparatus for the treatment of toilet waste, the combination of a rectangular tank, first and second transverse partitions in said tank dividing it into first and second and third compartments, said first partition plate being substantially imperforate at the bottom and having a large opening near the top for the passage of waste from the first compartment to the second compartment and the second partition plate being substantially imperforate at the top and having a large opening at the bottom for the passage of waste from the second compartment to the third compartment, walls within the tank adjacent the first compartment forming a pressure chamber connected to discharge toilet waste into said first compartment, an intake pipe communicating with said pressure chamber and connectible with a toilet to receive successive quantities of toilet waste therefrom and to momentarily establish increased pressures in said chamber, a discharge pipe connected with said third compartment for the discharge of effluent therefrom, a container for a disinfectant solution, a duct leading from said container to said first compartment, and means dependent upon each momentarily increased pressure within said pressure chamber for causing a quantity of the disinfectant solution to flow through said duct from said container and to said first compartment for mixing with toilet waste discharged thereinto from the pressure chamber.

17. In an apparatus for the treatment of toilet waste, the combination of a rectangular tank, first and second transverse partitions in said tank dividing it into first and second and third compartments, said first partition plate being substantially imperforate at the bottom and having a large opening near the top for the passage of waste from the first compartment to the second compartment and the second partition plate being substantially imperforate at the top and having a large opening at the bottom for the passage of waste from the second compartment to the third compartment, walls within the tank adjacent the first compartment forming a pressure chamber connected to discharge toilet waste into said first compartment, an intake pipe communicating with said pressure chamber and connectible with a toilet to receive successive quantities of toilet waste therefrom and to momentarily establish increased pressures in said chamber, a pressure openable valve between said pressure chamber and said first compartment which permits toilet waste when subjected to increased pressure to flow from said pressure chamber to said first compartment which valve restricts any reverse flow, a discharge pipe connected with said third compartment for the discharge of effluent therefrom, a container for a disinfectant solution, a duct leading from said container to said first compartment, and means dependent upon each momentarily increased pressure within said pressure chamber for causing a quantity of the disinfectant solution to flow through said duct from said container and to said first compartment for mixing with toilet waste discharged thereinto from the pressure chamber.

References Cited in the file of this patent

UNITED STATES PATENTS

| | | |
|---|---|---|
| 1,223,427 | Scarborough | Apr. 24, 1917 |
| 1,996,325 | Cox | Apr. 2, 1935 |
| 2,397,677 | MacGlashan | Apr. 2, 1946 |

FOREIGN PATENTS

| | | |
|---|---|---|
| 27,607 | Great Britain | 1909 |